United States Patent Office 2,786,085
Patented Mar. 19, 1957

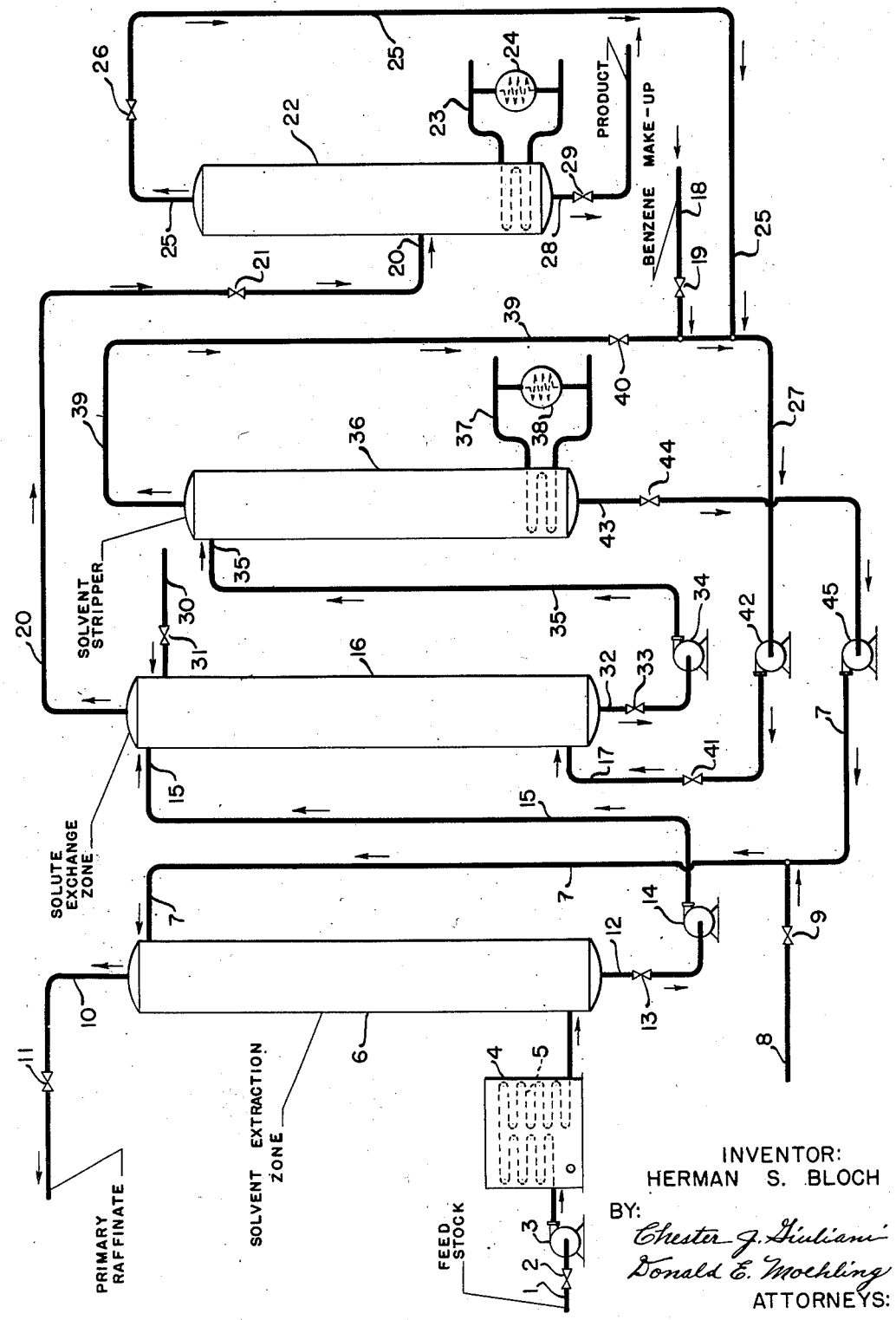

2,786,085

SOLVENT EXTRACTION PROCESS APPLIED TO FEED STOCKS OF HIGH BOILING POINTS

Herman S. Bloch, Chicago, Ill., assignor to Universal Oil Products Company, Chicago, Ill., a corporation of Delaware Application August 20, 1952, Serial No. 305,520

4 Claims. (Cl. 260—674)

This invention relates to a liquid-liquid extraction process for separating a mixture of organic compounds of relatively high boiling points utilizing a selective solvent for one or more components of the mixture preferentially miscible with the solvent. In one of its preferred specific applications, the process of the present invention concerns a separation process for the recovery of a polycyclic or high boiling alkyl aromatic hydrocarbon from a hydrocarbon mixture containing the same and utilizing a selective solvent for the aromatic hydrocarbon components of the feed stock, said extracted compound being recovered from the extract stream by displacement with a lower boiling, preferentially soluble polar compound.

The method of separation provided herein is essentially a liquid-liquid phase contacting process, preferably effected under countercurrent flow conditions, wherein a liquid solvent, generally an oxygen-containing or nitrogen-containing organic compound which selectively dissolves only one or less than all of the components of the feed stock mixture is contacted under binary phase mixing conditions with the feed stock to form distinct and separable phases, one of which is a rich solvent or extract phase containing the feed stock component or components selectively soluble in said solvent and the other a raffinate phase comprising the components rejected by the solvent and less readily dissolved therein. In accordance with conventional countercurrent extraction practice, the extract containing stream is separately treated, generally by heating or steam stripping the same, to recover the feed stock component dissolved in the solvent. It is evident that such solvent extraction method of recovery, although applicable to feed stock mixtures having boiling points below the boiling temperature or decomposition point of the solvent, may not generally be applied to feed stocks which boil above the boiling point of the solvent, and may only be applied to feeds which boil above the decomposition temperature of the solvent by use of distillation or stripping under vacuum or by other equally uneconomical procedures. The alternative procedure of stripping the solvent from the extract, although widely employed, is not economically attractive, especially when high solvent to extract ratios must be employed. The present method of separation, although a liquid-liquid solvent extraction process, is nevertheless applicable generally to the separation of feed stocks of relatively high boiling points and particularly to feed stocks which boil at a temperature above the boiling point of the solvent or above its thermal stability point. The principal object of the invention, therefore, is to provide a liquid-liquid extraction procedure for the treatment of high boiling feed stock mixtures to separate one or more components therefrom which are selectively soluble in the slovent extractant. Another object of the invention is to remove and recover substantially all of the relatively polar organic feed stock component or components of a mixture of organic compounds in a high state of purity or in a concentration greater than is present in the initial feed stock mixture.

In one of its embodiments, the present invention concerns a process for separating a polar organic compound A from a mixture thereof with a less polar organic compound B of substantially the same volatility which comprises contacting said mixture with a liquid solvent which selectively dissolves said compound A, forming thereby an extract phase comprising said compound A and said solvent, separating said extract phase from a resulting primary raffinate comprising said compound B, separately contacting said extract phase with a polar organic compound C which is more volatile with respect to and separable from said solvent and said compound A, thereby effecting the displacement of said compound A from said extract phase, separating a resulting secondary raffinate stream comprising compound A displaced into an excess of said compound C and a secondary extract phase comprising said compound C and said solvent, thereafter subjecting said secondary raffinate stream to distillation whereby said compound A is segregated from said compound C, and separately stripping compound C from said secondary extract phase to recover the solvent.

Another embodiment of the invention relates to a process for separating a polycyclic aromatic hydrocarbon from a non-aromatic hydrocarbon of approximately the same volatility which comprises contacting a mixture of said aromatic and non-aromatic hydrocarbons at a temperature of from about 75° to about 200° C. with an aqueous solution of at least one oxy-polyalkylene glycol in which said polycyclic aromatic hydrocarbon is selectively soluble, separating a resulting extract stream comprising said glycol and containing dissolved therein said polycyclic aromatic hydrocarbon from a resulting primary raffinate stream comprising non-aromatic hydrocarbon components of said mixture, separately contacting said extract stream with benzene, separating a resulting secondary raffinate stream comprising said polycyclic aromatic hydrocrabon dissolved in said benzene from a secondary extract stream, subjecting said secondary extract stream to distillation, separately recovering regenerated solvent and a benzene stream, recycling said regenerated solvent to said first-mentioned contacting step and said benzene to said last-mentioned contacting step, subjecting said secondary raffinate stream to distillation and separately recovering therefrom benzene and said polycyclic aromatic hydrocarbon.

Suitable feed stock mixtures which may be subjected to the present selective solvent extraction process include generally mixtures of organic compounds containing at least one component selectively soluble in the solvent charged to the process and characterized herein as a relatively polar organic compound A having a relatively high boiling point, usually above about 150° C. Relatively polar organic compounds characterizing the components of the feed stock mixture selectively soluble in the liquid solvent composition provided in the present process are characterized generally as being relatively more polar than the components of the feed stock mixture rejected by the solvent, although solubility and extractability of any particular feed stock component in the solvent is not necessarily strictly correlated with the dipole moment of the compound selectively soluble in and extracted by the solvent. For purposes of the present invention, the polarity of an organic compound is considered to be equivalent to solubility in the selective solvent provided in the extraction stage of the process. In general, polarity is characterized by the relatively greater tendency of the compound to associate with other organic compounds commonly utilized as solvents and to form weak complexes or associations with other organic compounds. Polarity in an organic compound generally accompanies the presence of one or more electronegative substituents in the structure of the compound, although the presence of such substituents is not necessarily its only property which characterizes its tendency to polarize or to dissolve in the present solvent, as illustrated in the case of the relatively soluble aromatic hydrocarbons which are readily separable from other hydrocarbon types by solvent extraction, but contain only hydrogen-carbon bonds. In the case of liquid-liquid solvent extraction, the component of the mixture having the greatest polarity herein designated as members of the group A compounds, is believed to associate itself with the solvent in a state known as a "complex" more readily than do other, less polar and less readily extracted components.

The relatively high solubility of aromatic hydrocarbons as compared with other hydrocarbon types of like boiling range is illustrative of the second criterion by which the more soluble A compounds may be designated—namely, that their carbon:hydrogen ratio is greater than that of the less extractable materials of like boiling range. Thus, in a narrow boiling fraction of mixed hydrocarbons, aromatics are more soluble than dienes, cycloolefins and acetylenes; dienes, cycloolefins and acetylenes more soluble than mono-olefins and naphthenes; and mono-olefins and naphthenes more soluble than paraffins. In general, unsaturated compounds are more soluble than saturated materials of the same carbon:hydrogen ratio, the unsaturation lending a degree of polarity which tends to increase the solubility; thus a mono-olefin is more soluble than a monocyclic cycloparaffin hydrocarbon of like boiling range.

In accordance with the above criteria, it is seen that more highly unsaturated glycerides occurring in vegetable or animal oils may be selectively dissolved from less unsaturated fatty glycerides, leading to a useful molecular segregation whereby, for example, a semi-drying oil may be converted to an extract comprising a fast drying oil and a raffinate of substantially more saturated character than the feed, suitable for edible purposes.

Although the extractability of a particular component of the feed stock mixture is believed to be correlated generally with its polarity or its carbon:hydrogen ratio, it is not intended to restrict the types of organic compounds suitable as feed stocks to the solvent extraction process by such definition, the feed stock mixture in any event comprising a mixture of at least one compound A more soluble in the solvent than the remaining components of the mixture designated as members of the group B compounds.

The selective solvent extraction process of this invention may be applied to various mixtures of organic compounds containing one or more polar organic components and is applicable to a variety of mixtures of polar organic compounds. Thus, for example, the process may be utilized for the segregation of high molecular weight mercaptans, alkyl sulfides and dialkyl sulfides from hydrocarbon mixtures, such as relatively high boiling petroleum fractions represented, for example, by a gas oil fraction boiling from about 200° to about 350° C., lubricating oil fractions generally boiling above 300° C. or to the products of a Fischer-Tropsch reaction which may contain such polar components as alcohols, ketones, and aldehydes. The process is also useful for the recovery of polycyclic aromatic phenols such as the naphthols from hydrocarbon fractions; for the separation of the mixture of products of high molecular weight hydrocarbon oxidation reactions, the products of which may contain one or more carboxyl, carbonyl or hydroxyl groups per molecule; for the extraction of polycyclic aromatic hydrocarbons such as naphthalene, anthracene, phenanthrene and their alkyl derivatives from lubricating oil fractions of petroleum; for the separation of aromatic (i. e. smoking) components from kerosenes to be used for lighting purposes; for the removal of asphaltenes and other carbon-generating components from hydrocarbon feed stocks for catalytic conversions such as catalytic cracking; and for the extraction of unsaturated fatty acids or their glyceride esters from the saturated acids or esters. Typical hydrocarbon mixtures utilizable as one type of feed stock in the present extraction procedure include distillate fractions of catalytically cracked petroleum, coal tar distillate fractions, specific boiling range fractions of straight-run petroleum distillates and narrow or wide boiling range fractions of certain reformed or hydroformed petroleum fractions which are generally relatively rich in aromatic hydrocarbons and are a particularly suitable source of polycyclic and alkyl aromatic hydrocarbons.

The feed stock mixture of separable organic components may be subjected to continuous solvent extraction with the solvents herein provided most advantageously in a countercurrent liquid-liquid contacting procedure, although co-current flow of solvent and the feed stock may likewise be adapted to the present process. In the preferred countercurrent method of operation, the solvent is introduced near one end of an extraction zone such as a vertical, elongated column, usually the uppermost end of the zone, since the solvent is usually the phase of greatest density present within the extraction column, from which end a raffinate stream comprising rejected or non-extracted class B compounds of the feed stock mixture is also removed. The liquid feed stock is introduced at a point in the extraction column below the raffinate outlet near the opposite end of the column. An extract phase or fat solvent stream comprising substantially all of the solvent and containing dissolved therein the extracted, relatively polar class A component of the feed stock mixture is removed from the opposite end of the column below the point of entry for the feed stock in the embodiment in which the solvent is the phase of greatest density. The stream of extract is thereafter separately treated in accordance with the succeeding stages of the present process, as hereinafter described.

The selective solvent-extractant employed in the present separation process may be a single component liquid of an organic compound capable of dissolving a substantial quantity of the polar A component of the feed stock, a mixture of two or more organic components of this type capable of dissolving components from the feed stock mixture and preferentially the relatively polar A components thereof, or a mixture of such organic primary solvents with a secondary solvent component which increases the selectivity of the solvent composition for dissolving the polar A component of the feed stock. The presence of the secondary solvent constituent reduces the tendency of the raffinate B components to dissolve in the solvent stream and thus increases the capacity of the solvent to reject these non-polar components of the feed stock mixture when contacted therewith in the primary extraction stage of the process.

Organic compounds which preferentially dissolve at least one of the A compounds of the feed stock may be of any particular composition suitable for this purpose, but organic compounds characterized as oxygen-containing or nitrogen-containing organic compounds are particularly suitable in their liquid state as selective solvents in the present process. These compounds, also designated as the primary solvent component, may be selected from such classes of compounds as the aliphatic and cyclic alcohols, the glycol ethers (also referred to as polyalkylene glycols) as well as the glycol esters and glycol ether esters. In addition, certain other classes of compounds such as the ketones and the nitriles, particularly the oxynitrile ethers also constitute a particularly preferred class of oxygen-containing organic compounds utilizable as solvents herein. The preferred polyoxypolyalkylene glycols have the general empirical formula: $HO(C_nH_{2n}O)_xH$, wherein $n$ has a value of from 2 to about 5 and $x$ has a value from 1 to about 15. Particularly effective members of the polyalkylene glycol series of compounds are the mono-, di-, tri- and tetra-ethylene glycols, particularly oxydiethylene glycol, mono-, di- and tri-propylene glycols and the mono-, di- and tri-butylene glycols. Certain glycol ethers, such as the Cellosolve series of compounds (defined structurally as the alkyl ethers of ethylene glycol) and including methyl-, ethyl-, propyl-, and butylcellosolve are also effective solvents in the process. The Carbitols (defined structurally as the alkyl ethers of diethylene glycol) such as the methyl-, ethyl-, propyl-, and butylcarbitols; the glycol and polyoxypolyalkylene glycol esters of low molecular weight organic acids such as the acetates and propionates; the higher alcohols, such as caproyl alcohol, 2-ethylhexanol, lauryl alcohol, and the like; certain cyclic alcohols such as cyclo-pentanol, cyclo-hexanol, etc.; phenols and alkylphenols such as phenol itself, resorcinol, pyrocatechol, the various cresols, thymol etc.; the organic acid esters, such as the fatty acid esters of aliphatic alcohols; and the cyano ethers, such as $\beta,\beta'$-oxy-dipropionitriles, $\beta,\beta'$-thiodipropionitrile and other typical representative compounds of the above series of compounds comprise an effective group of solvents. In the preferred method of recovering the dissolved solute components from the extract phase removed from the solute exchange zone of the present process, the solvent is stripped of the remaining dissolved solute by introducing a vapor such as steam, to remove substantially completely the last traces of dissolved solute. For this purpose, it is generally preferred to utilize a selective solvent composition containing a solvent component having a relatively high boiling point and low vapor pressure, the composition thereby remaining substantially in liquid phase when the fat solvent or extract phase is subjected to stripping in a succeeding stage of the process.

In order to increase the selectivity of the solvent for the desired A compound to be extracted from the feed stock mixture, the solvent preferably contains a secondary solvent component which reduces the solubility of the raffinate or B components in the solvent without materially affecting the solubility of the desired A component to be recovered in the process. The secondary solvent component may also be useful for the specific purpose of providing a stripping agent in the solvent stripping stage of the process by selecting a secondary solvent capable of vaporizing from the stripping zone as a side stream, the vapors being introduced in a heated state into the lower portion of the stripping column where the sensible heat of the vapors volatilizes the last traces of extracted solute from the rich solvent stream. Since the solvent composition supplied to the extraction zone is desirably a homogeneous solution of the primary and secondary solvent constituents, it is essential that these constituents be mutually soluble. Normally liquid compounds possessing these properties, and as such suitable for use as the secondary solvent constituent, are such materials as water, furan, furfurol, furfuryl alcohol, low molecular weight esters such as methyl acetate, ethyl acetate, methyl lactate, and the like, the nitro-paraffins and their halogen-substituted analogs of low molecular weight such as nitromethane, nitroethane, di-nitrobutane, nitrodichloropropane and others, as well as the low molecular weight nitriles, such as acetonitrile. One of the preferred secondary solvents utilizable in admixture with a polyethylene and/or polypropylene glycol utilized as primary solvent constituents is water which is desirably present in such a selective solvent composition in amounts sufficient to yield aqueous glycols containing from 2 to about 40% by weight of water.

In many cases it is particularly advantageous to vary the amount of secondary solvent (usually by increasing it) after the first extraction step and prior to or during the second extraction step, wherein rich solvent from the first extraction is contacted with the relatively volatile displacing agent herein designated as compound C.

The extraction of high boiling feed stock mixtures with selective solvents may be effected at temperatures of from about 30° to about 200° C., depending upon the type of feed stock, the composition of the solvent and other mutually operable factors. In the case of the aqueous glycols, particularly an aqueous mixture of diethylene and dipropylene glycols, the preferred extraction temperature is from about 100° to about 175° C., the solvent being maintained in liquid phase by the imposition of a superatmospheric pressure in the extraction zone, pressures up to about 15 atmospheres generally being sufficient for the maintenance of liquid phase conditions. The volume of solvent per volume of feed stock charged to the extraction zone depends upon the concentration of the polar or A component in the feed stock mixture and the temperature and composition of the solvent, but generally volume ratios of solvent to feed stock of from about 1 to 1 to about 30 to 1 and preferably from about 3 to 1 to about 20 to 1 provide a suitable operating range of this factor for most feed stocks; however even higher ratios may be employed in the case of certain solvents of high selectivities and feed stocks containing a large proportion of organic polar component. The particular operating conditions essential for the recovery of the desired product are variables which must necessarily be determined on the basis of the particular feed stocks and in some instances higher temperatures may be required for the sole purpose of reducing the viscosity of the feed stock in order to permit adequate flow rates between the individual units of the process.

In accordance with the flow of the present process, the extract or rich solvent phase formed in the solvent extraction zone is removed therefrom and contacted in a secondary contacting or extraction zone, referred to herein as a solute-exchange zone, with a polar organic compound C more volatile than the solvent or compound A in the extract phase whereby compound A derived from the feed stock is displaced therefrom with the preferentially soluble, lower molecular weight, organic compound C supplied to the solute exchange zone in excess of that required to displace compound A from the fat solvent. It is generally preferred, although not necessarily essential, that organic compound C utilized in the solute exchange zone for preferential displacement of the extracted component from the fat solvent stream be a lower molecular weight, more volatile compound of the same class of compounds as compound A extracted by the solvent from the feed stock. Thus, in the recovery of a high molecular weight aromatic hydrocarbon, such as a polycyclic or alkyl-benzene hydrocarbon from non-aromatic hydrocarbons in admixture therewith, compound C utilized in the solute exchange zone for the purpose of displacing the high boiling extracted feed stock component A may be a low molecular weight aromatic compound such as benzene, toluene, a xylene, ethylbenzene, etc. or a mixture of such lower molecular weight aromatic hydrocarbons, or a naphtha containing these aromatic hydrocarbons. Similarly, in the extraction of a high molecular weight fatty acid ester from a mixture of such esters of similar molecular weight, the compound C utilized for displacing the extracted ester from the fat solvent stream may be a lower molecular weight fatty acid ester, such as ethyl acetate, butyl formate, iso-propyl acetate etc. Although the particular compound C utilized to displace the extracted component from the fat solvent stream is desirably a compound of the same general class of materials as the solute contained in the fat solvent stream and is also preferably a compound preferentially dissolved by the solvent, these conditions are not necessarily essential to effect the displacement of the dissolved A compound from the fat solvent stream. Thus, the displacing compound C may be one which is merely soluble in the solvent but not necessarily preferentially soluble as compared to the feed stock-derived compound A dissolved in the solvent during the extraction stage of the process. For example, a polycyclic aromatic hydrocarbon of relatively high boiling point extracted by the solvent in the extraction stage may be displaced with a generally less readily extracted polyolefinic or cycloolefinic hydrocarbon of lower molecular weight, such as heptadiene, methylcyclohexane, etc. In such instances, however, the displacing compound C which is less preferentially soluble in the solvent than the extracted component A must generally be supplied to the secondary extraction column or solute exchange zone in greater volume ratio with respect to the fat solvent than in the case of utilizing a more preferentially soluble organic compound of lower molecular weight than the extracted solute component, generally in a volume ratio of displacing agent to fat solvent stream of from about 0.1 to 1 to about 30 to 1 volumes per volume of extract phase or fat solvent stream. It is generally preferred, however, to utilize an organic compound C of lower molecular weight which is preferentially soluble in the solvent as compared to the extracted component, although not necessarily of the same general class of compounds as the solute component of the fat solvent stream, suitable flow rates of the respective streams in such instances being from about 0.1 to 1 to about 10 to 1 volumes of displacing agent to fat solvent stream. A high molecular weight alkyl aromatic hydrocarbon, for example, such as dodecylbenzene, may be displaced from the fat solvent stream recovered from the primary extraction zone with benzene, toluene or other alkyl aromatic hydrocarbon of shorter chain length than the dodecyl group, since alkyl aromatic hydrocarbons containing shorter chain length alkyl groups are generally more soluble in the solvent than alkyl aromatic hydrocarbons containing long chain alkyl groups. In like manner, an unsaturated fatty acid ester, such as the glyceride ester of oleic acid is replaced from the fat solvent stream by contacting the fat solvent with a stream of a lower-boiling, more soluble ester, such as ethyl benzoate, the latter being preferentially soluble in the solvent as compared to the oleic acid ester of glycerol. Depending upon the relative solvency in the selective solvent composition supplied to the primary extraction zone, the quantity of compound C utilized as displacing agent in the solute-exchange zone may vary over a relatively wide range of flow rates, the volumetric ratio of displacing agent C to fat solvent required to completely displace the extracted component A from the fat solvent stream being greater in the case of utilizing displacing agents which are less preferentially soluble than the extracted component of the feed stock than when utilizing a displacing agent more readily dissolved in the solvent stream than the extracted feed stock component.

The volume ratio of displacing agent or compound C to fat solvent supplied to the solute exchange zone is also dependent upon the type of contact made between the two streams during the exchange. In general, the volume ratio may be considerably less when countercurrent flow between the displacing agent and the fat solvent stream is employed than in the case of merely mixing the two fluids or in co-current flow operations. For this reason, countercurrent flow is generally preferred, the displacing agent, which is usually the phase of least density, being introduced into the lowermost portion of the solute exchange zone and allowed to flow upwardly therein against a countercurrent stream of the fat solvent introduced into the top of the solute exchange zone, the latter generally being in the form of an elongated vertical column containing means for dispersing one liquid phase in finely divided form in a stream of the other liquid phase, such as sieve deck plates, a suitable packing material, bubble caps and trays or other arrangement to effect more intimate contact between the countercurrently flowing streams.

As a result of the displacing agent contacting the fat solvent stream in the solute-exchange zone, compound A preferentially extracted from the feed stock in the primary extraction zone is displaced therefrom with the displacing agent of lower molecular weight, the primary extract phase thereafter containing dissolved therein the displacing agent as a secondary extract phase. The excess of compound C charged into the solute-exchange zone provides a stream containing the displaced feed stock component A as a distinct, separable phase which may be removed from the solute exchange zone, generally as a continuous stream when countercurrent flow operating conditions are provided. Since the displacing agent is selected from the organic compounds of lower molecular weight, and hence of greater volatility than the extracted component of the feed stock, the stream containing displaced compound A dissolved in the excess displacing agent, herein referred to as a "secondary raffinate stream," may be charged into a distillation column wherein the two components comprising this stream, that is, the displacing agent or compound C and displaced feed stock component or compound A, are separated by distillation as distinct fractions having differing boiling points.

The operation of the present process as applied to a particular method of separation and to a particular feed stock comprising a preferred embodiment of the invention is further described in the accompanying diagram which illustrates, for the sake of convenience, the method of separation applied to a high boiling hydrocarbon feed stock containing naphthalene as component A to be recovered by means of the present process and various aliphatic hydrocarbons including paraffins as compound B, utilizing benzene as the displacing agent (compound C) in the solute exchange stage of the process flow. A suitable selective solvent composition for a feed stock and displacing agent of this type is an aqueous solution of a mixture of diethylene and dipropylene glycols, containing for example, from about 5% to about 15% by weight of water, from about 5 to about 40% by weight of diethylene glycol and from about 50 to about 90% by weight of dipropylene glycol.

Referring to the accompanying diagram, a feed stock mixture containing an extractable proportion of naphthalene and methylnaphthalenes, such as the kerosene boiling range fraction of an aromatic-rich petroleum stock, boiling, for example, from about 200° to about 275° C., is charged into the process flow from storage through line 1 and valve 2. The feed stock is transferred by means of pump 3 into heater 4 containing a heating coil 5 wherein the naphthalene containing feed stock is heated to the desired extraction temperature generally from about 75° to about 200° C. The feed stock at this temperature is charged at a sufficient pressure supplied by pump 3 to maintain liquid phase at the above temperature into solvent extraction zone 6 generally at some intermediate point within the extraction zone between a raffinate outlet at the top of the column and an extract phase outlet at the bottom of the column, preferably at a point immediately above the extract phase outlet. A selective solvent for the naphthalene component of the feed stock, usually a compound which has a greater specific gravity than the hydrocarbon feed stock, is introduced into the top of the extraction zone through solvent recycle line 7, the solvent being recycled from subsequent stages of the process. In order to replace solvent losses in the system, if any, make-up solvent may be introduced into the flow through line 8 in amounts controlled by valve 9, line 8 connecting with solvent charge line 7. The relatively dense solvent stream flows downwardly through extraction column 6 against a rising stream of feed stock introduced into the bottom of extraction zone 6. The countercurrent contact between the solvent and feed stock selectively removes the naphthalene component from the latter hydrocarbon mixture and rejects the paraffins, olefins, and naphthenes, one or more of which may also be present in the feed stock mixture. The upwardly flowing, rejected feed stock components, comprising the primary raffinate of the process is removed from column 6 through line 10 and valve 11 to storage, to water washing equipment, not shown, for removal of traces of solvent therefrom, or for further processing, if desired. The relatively dense solvent stream which gravitates toward the lower end of column 6 and which contains the naphthalene component of the feed stock dissolved therein is removed as a fat solvent stream or extract phase from extraction zone 6 through line 12 in amounts controlled by valve 13. It is to be emphasized that although the solvent in most cases is relatively more dense than the feed stock mixture, extraction is equally operable for feed stock mixtures which are more dense than the selective solvent composition, and in such cases the raffinate and extract streams and the feed stock and solvent ports of entry into zone 6 are reversed and are on opposite ends of the column from those shown.

The fat solvent stream formed in primary extraction zone 6 is transferred by means of pump 14 through line 15 into the upper portion of the solute exchange zone or secondary extraction zone 16 wherein the high boiling naphthalene component of the fat solvent stream is displaced with the more volatile benzene displacing agent which is introduced into the lower portion of zone 16 through line 17. The benzene is recovered from subsequent stages of the process, as hereinafter described, or may be supplied from external sources entirely or only in an amount sufficient to replace benzene losses from the system, the latter quantity being introduced into the process flow from benzene make-up through line 18 in an amount controlled by valve 19 which determines the quantity of benzene charged into the benzene recycle line. The flow of displacing agent and fat solvent stream in zone 16 is also desirably countercurrent to provide the most efficient method for displacing the naphthalene component of the fat solvent with benzene. Since the fat solvent is generally the stream of greatest specific gravity when utilizing a relatively dense solvent such as an aqueous mixture of glycols, this stream is introduced into the top of solute exchange zone 16 and allowed to flow downwardly in countercurrent relationship with the stream of benzene introduced into the bottom portion of column 16. In one of the preferred embodiments of the invention, the benzene is introduced in a volume sufficient to completely saturate the selective solvent in addition to displacing the naphthalene component from the fat solvent stream, thus providing a benzene-containing effluent stream or secondary raffinate from the top of the column which carries in solution the displaced naphthalene component. The benzene and naphthalene-containing stream is removed from the upper portion of the solute exchange column 16 through line 20 and valve 21 into a stripping zone such as distillation column 22 having a reboiler coil 23 in the lower portion of column 22 which supplies heat to the reboiling coil inside the column from a heat exchanger such as heating unit 24 external to the column. The relatively volatile benzene component in the stream charged into distillation zone 22 is removed overhead as a light fraction through vapor overhead line 25 containing valve 26, the benzene stream joining another stream of benzene recovered as hereinafter described for recycle to the lower portion of the solute exchange zone 16. The high boiling naphthalene component charged into distillation zone 22 collects as a residue in the lower portion of column 22 and is removed therefrom through line 28 in controlled amounts determined by valve 29 to storage or to further fractionating facilities to separate a naphthalene product of greater purity, if desired.

In many cases, as when aqueous glycols are used as the solvent, it will be desirable to insert water washing facilities in line 20 (not shown) whereby residual glycols may be recovered from the secondary raffinate stream prior to distillation of the latter in column 22. The water washings, containing dissolved recovered solvent, may be charged to the solvent extraction zone, the solute exchange zone, the solvent stripper, or they may be separately distilled to recover solvent therefrom. In order to promote the displacement of the dissolved solute component A such as the extracted naphthalene compound from the fat solvent stream, a stream of secondary solvent (such as water or the aqueous glycol stream recovered from the raffinate washing procedure) may be mixed with the primary extract phase or fat solvent stream before the latter enters the solute exchange zone. Alternatively, the fat solvent may be mixed in the upper portion of the zone with the additional secondary solvent charged to the top of the column. For this purpose, water may be introduced into column 16 through line 30 in amounts controlled by valve 31.

Referring to column 16, the fat solvent stream which flows countercurrently downward in solute exchange relationship with the benzene stream introduced into the lower portion of column 16 through line 17 is removed from the bottom of the solute exchange zone through line 32 in amounts controlled by valve 33 and transferred by means of pump 34 through line 35 into the upper portion of solvent stripping zone 36 for the regeneration of a lean solvent recycle stream and for the recovery of the benzene component therefrom. The fat solvent stream thus removed from column 16 and introduced into stripper 36 contains only benzene dissolved in the solvent by virtue of having displaced the naphthalene component from the fat solvent stream formed in the primary extraction stage of the process, provided that such replacement is efficient to the extent of having effected the quantitative removal of the naphthalene component from the fat solvent during its time of contact with the benzene in zone 16. In order to enhance the solubility of benzene in the solvent relative to that of the naphthalenes, and thereby permit the displacement of the naphthalene component from the fat solvent stream, the temperature or the water content of the latter stream may be adjusted prior to their introduction into zone 16, as indicated, by water introduced into zone therein through line 30.

Solvent stripping column 36 is operated under conditions suitable to effect the substantially complete removal of benzene from the fat solvent stream charged thereto and thereby regenerate a lean solvent substantially free of hydrocarbon solute components, desirably as free of solute as possible to increase its solvency in the primary extraction zone 6. Solvent stripping zone 36 is desirably provided with a reboiling coil, such as reboiler 37 in its lower portion, the reboiler being supplied with heat in heat exchanger 38. In order to accomplish as complete removal of benzene from the fat solvent stream as possible, column 36 may be operated at a reduced pressure relative to zone 6 and 16, and a stripping agent such as steam may be introduced into the lower portion of zone 36, or other suitable means for effecting substantially complete vaporization of the benzene from the fat solvent stream may be provided in zone 36. If steam stripping is employed, the condensate water may be employed for scrubbing or water-washing the solute in the line 20 stream (as previously described) before being returned to the stripper column 36. The benzene stripped from the fat solvent is removed as an overhead fraction from column 36 through line 39, and discharged in amounts controlled by valve 40 into benzene recycle line 27, the benzene being transferred into line 17 through valve 41 by means of pump 42. If heated prior to its recycle into column 16, a suitable heat exchange unit, not illustrated, is incorporated into the recycle flow line. The stripped glycol solvent from which the hydrocarbon solute components have been removed is withdrawn from the lower portion of column 36 through line 43, through valve 44 and transferred by means of pump 45 into glycol recycle line 7 which discharges the recycled lean solvent into the top of solvent extraction zone 6 in accordance with the process flow heretofore described.

One of the preferred methods of operation, generally resulting in the most efficient process and resulting in the least consumption of heating utilities in the combined flow is provided when solvent extraction zone 6, solute exchange zone 16 and solvent stripper 36 are operated at substantially the same temperature, stripping being effected in zone 36 by reduction of the pressure on the fat solvent stream charged thereto, for example, to atmospheric pressure, and zones 6 and 16 being operated at superatmospheric pressures in order to maintain liquid phase therein.

The present invention is further illustrated with respect to some of its preferred embodiments in the following examples which are introduced merely for the purpose of illustration and not with the intention of unduly limiting the scope of the invention in accordance therewith.

Example I

Naphthalene is recovered in substantially pure form utilizing an extraction procedure similar in its essential respects to the flow described in the above accompanying diagram. A hydrocarbon feed stock comprising the gas oil fraction of a catalytically cracked Mid-Continent petroleum crude, boiling in the range of from 200° to about 230° C. and containing 13% by weight of naphthalene is charged into the bottom of a sieve-deck extraction column containing 45 plates while an aqueous diethylene glycol solvent containing about 7.5% water is charged onto the top tray of the column i. e. on plate 1. The flow rates of the gas oil fraction and solvent are adjusted to provide a solvent to feed stock ratio of 10/1. A raffinate phase containing less than 0.3% by weight of aromatic components is removed from the top of the extraction column, an extract phase or fat solvent stream containing dissolved naphthalene is removed from the bottom of the column and charged into the top of the solute-exchange column, and a benzene stream is charged into the bottom of the column. The latter solute-exchange column is a quartz chip-packed contacting zone maintained at the above specified temperature of 135° C. and at a pressure of 90 lbs./in.² gage. The benzene rate of flow is sufficient to provide a benzene to fat solvent ratio of 2/1 in the solute-exchange column. A secondary raffinate stream comprising excess benzene, above the quantity required to displace naphthalene from the fat solvent and containing dissolved therein the displaced naphthalene formerly in the primary extract phase, is removed from the top of the solute-exchange column and diverted to a fractional distillation column for the separation of the light benzene displacing agent from the higher boiling naphthalene product extracted from the feed stock. The benzene is taken overhead from the column and recycled to the solute-exchange column. A high boiling bottoms residue containing 98.5% naphthalene is removed from the bottom of the still; the yield of crude naphthalene thus recovered represents from about 12% to about 12.8% by weight of the initial gas oil charged to the process.

The secondary fat solvent stream removed from the bottom of the solute-exchange column is charged into a solvent stripping column wherein the pressure on the fat solvent stream is reduced in stages from 90 lbs./in.² to atmospheric pressure. In the first stage wherein the pressure is reduced to 30 lbs./in.², a benzene-containing fraction, with some water, is distilled overhead. In the second stage pressure reduction, a fraction comprising benzene, water and a small quantity of solvent is distilled from the column as a side stream. The overhead fraction is condensed and the benzene recycled to the solute-exchange column. Superheated steam at a temperature of 150° C. is injected into the fat solvent residue in the bottom of the column, the residue also being heated with a reboiler coil through which heated diphenyl oxide is circulated. A lower side-cut fraction removed at substantially atmospheric pressure, containing a small amount of residual naphthalene, benzene and water is removed from the stripping column, condensed, and run into a receiver vessel. The upper hydrocarbon layer recovered from the lower side-cut fraction is decanted from the water and recycled to the feed stock charge line into the solute exchange zone. Both water condensate streams may be recycled to the solvent extraction zone, to the solute exchange zone, or to the solvent stripper, or may be used to scrub glycol from the secondary solute (benzene) solution of naphthalene prior to distillation of this stream, and then recycled to one or more of the zones mentioned.

The naphthalene-containing residue of the benzene stripping column is redistilled to separate a residue containing 99.+% by weight of naphthalene.

Example II

The "alkylate" product of a sulfuric acid-catalyzed alkylation of benzene with a dodecylene-containing cracked naphtha fraction contains about 8% by volume of olefinic hydrocarbons (presumably polymers) which cannot be removed from the desired benzene alkylate components by fractional distillation because of the close proximity of the boiling points of the olefinic hydrocarbon contaminants to the desired dodecylbenzene product. The crude "alkylate" as separated from the products of the alkylation reaction has a bromine number of 5, indicating the substantially olefinic character of the "alkylate." When sulfonated to produce an alkylarylsulfonate type of detergent, the olefin-contaminated product produces a neutralized sulfonate which is dark-colored and has a detergency substantially less than the detergent prepared from a specially purified dodecylbenzene alkylate.

The above-referred to contaminated "alkylate" is utilized as feed into a countercurrent liquid-liquid extraction column to separate a more desirable alkylate product for detergent manufacture therefrom free of contaminating hydrocarbons. The extraction conditions of temperature, pressure, solvent flow rate and solvent composition utilized in the process are essentially similar to the extraction conditions described in Example I, above, except that toluene is utilized as the solute-exchange displacing agent. The dodecylbenzene product recovered from the toluene component of the secondary raffinate stream in the toluene stripping column following the solute-exchange operation is substantially pure de-olefinized aromatic (bromine No. 0.2) and when sulfonated, followed by neutralization of the resulting alkylarylsulfonic acid with caustic soda, the detergent product is white and its detergency equal to the specially purified sample of dodecylbenzene sulfonate.

I claim as my invention:

1. A process for separating a polycyclic aromatic hydrocarbon from a non-aromatic hydrocarbon of approximately the same volatility which comprises contacting a mixture of said aromatic and non-aromatic hydrocarbons at a temperature of from about 75° to about 200° C. with a solvent comprising an aqueous solution of at least one polyoxyalkylene glycol capable of selectively dissolving said polycyclic aromatic hydrocarbon, said hydrocarbons being higher boiling than said solvent, separating a resulting fat solvent stream comprising said solvent and containing dissolved therein said polycyclic aromatic hydrocarbon from a resulting primary raffinate stream comprising a non-aromatic hydrocarbon component of said mixture, separately contacting said fat solvent stream with a monocyclic aromatic hydrocarbon of greater volatility than said polycyclic aromatic hydrocarbon, separating a resulting secondary raffinate stream comprising said polycyclic aromatic hydrocarbon dissolved in an excess of said monocyclic aromatic hydrocarbon from a secondary fat solvent stream, subjecting said secondary fat solvent stream to distillation, separately recovering regenerated solvent and a monocyclic aromatic hydrocarbon stream, recycling said regenerated solvent to said first-mentioned contacting step and said monocyclic aromatic hydrocarbon to said last-mentioned contacting step, and separately recovering monocyclic and polycyclic aromatic hydrocarbons from said secondary raffinate stream.

2. A process for separating a polycyclic aromatic hydrocarbon from a non-aromatic hydrocarbon of approximately the same volatility which comprises contacting a mixture of said aromatic and non-aromatic hydrocarbons at a temperature of from about 75° to about 200° C. with a solvent comprising an aqueous solution of at least one polyoxyalkylene glycol capable of selectively dissolving said polycyclic aromatic hydrocarbon, said hydrocarbons being higher boiling than said solvent, separating a resulting fat solvent stream comprising said solvent and containing dissolved therein said polycyclic aromatic hydrocarbon from a resulting primary raffinate stream comprising a non-aromatic hydrocarbon component of said mixture, separately contacting said fat solvent stream with a monocyclic aromatic hydrocarbon of greater volatility than said polycyclic aromatic hydrocarbon, separating a resulting secondary raffinate stream comprising said polycyclic aromatic hydrocarbon dissolved in an excess of said monocyclic aromatic hydrocarbon from a secondary fat solvent stream, subjecting said secondary fat solvent stream to distillation, separately recovering regenerated solvent and a monocyclic aromatic hydrocarbon stream, recycling said regenerated solvent to said first-mentioned contacting step and said monocyclic aromatic hydrocarbon to said last-mentioned contacting step, subjecting said secondary raffinate stream to distillation and separately recovering monocyclic and polycyclic aromatic hydrocarbons therefrom.

3. A process for separating a polycyclic aromatic hydrocarbon from a non-aromatic hydrocarbon of approximately the same volatility which comprises contacting a mixture of said aromatic and non-aromatic hydrocarbons at a temperature of from about 75° to about 200° C. with a solvent comprising an aqueous solution of at least one polyoxyalkylene glycol capable of selectively dissolving said polycyclic aromatic hydrocarbon, said hydrocarbons being higher boiling than said solvent, separating a resulting fat solvent stream comprising said solvent and containing dissolved therein said polycyclic aromatic hydrocarbon from a resulting primary raffinate stream comprising a non-aromatic hydrocarbon component of said mixture, separately contacting said fat solvent stream with benzene, separating a resulting secondary raffinate stream comprising said polycyclic aromatic hydrocarbon dissolved in an excess of said benzene from a secondary extract stream, subjecting said secondary extract stream to distillation, separately recovering regenerated solvent and a benzene stream, recycling said regenerated solvent to said first-mentioned contacting step and said benzene to said last-mentioned contacting step, subjecting said secondary raffinate stream to distillation and separately recovering therefrom benzene and said polycyclic aromatic hydrocarbon.

4. The process of claim 3, further characterized in that said polycyclic aromatic hydrocarbon is naphthalene.

References Cited in the file of this patent

UNITED STATES PATENTS

| | | |
|---|---|---|
| Re. 19,763 | Tuttle | Nov. 19, 1935 |
| 2,114,524 | Egli | Apr. 19, 1938 |
| 2,176,396 | Fenske et al. | Oct. 17, 1939 |
| 2,261,799 | Franklin | Nov. 4, 1941 |
| 2,414,252 | Ashburn | Jan. 14, 1947 |
| 2,568,176 | Vriens et al. | Sept. 18, 1951 |
| 2,633,448 | Neuworth | Mar. 31, 1953 |